United States Patent
Cecchini et al.

(10) Patent No.: US 6,292,794 B1
(45) Date of Patent: Sep. 18, 2001

(54) METHOD OF INTEGRATING TEXT RETRIEVAL TO ENHANCE SOFTWARE STEM SEARCHING

(75) Inventors: Albert B. P. Cecchini, Jamestown; James R. Mead, Ballston, both of NY (US)

(73) Assignee: Libera, Inc., Jamestown, NY (US)

( * ) Notice: Subject to any disclaimer, the term of this patent is extended or adjusted under 35 U.S.C. 154(b) by 0 days.

(21) Appl. No.: 09/177,145

(22) Filed: Oct. 22, 1998

(51) Int. Cl.[7] .................................................. G06F 17/00
(52) U.S. Cl. ............................ 707/3; 707/4; 707/5; 707/6
(58) Field of Search ........................ 707/2–10, 100–104, 707/531–534

(56) References Cited

U.S. PATENT DOCUMENTS

| | | |
|---|---|---|
| 4,884,218 | 11/1989 | Agnew et al. ......................... 706/50 |
| 5,369,577 | * 11/1994 | Kadashevich et al. .............. 707/534 |
| 5,708,829 | * 1/1998 | Kadashevich et al. .............. 707/531 |
| 5,819,251 | * 10/1998 | Kremer et al. ....................... 707/103 |
| 6,012,053 | * 1/2000 | Pant et al. ............................... 707/6 |

OTHER PUBLICATIONS

Fowler et al., "A group–technology–coded literature review of semiconductor manufacturing operations publications: the MASMLB bibliography web site", Semiconductor Manufacturing, IEEE Transactions on , vol. 12, Issue 2, pp. 259–263, May 1999.*

Loebbecke, "Electronic Trading in On–Line Delivered Content", Systems Science, 1999, Proceedings of the 32nd Annual Hawaii International Conference on , pp. 1–10.*

Mitaim et al., "Neural fuzzy agents that learn profiles and search databases", Neural Networks, 1997, International Conference on, vol. 1, pp. 467–472, vol. 1.*

* cited by examiner

*Primary Examiner*—Thomas Black
*Assistant Examiner*—David Jung
(74) *Attorney, Agent, or Firm*—McDermott, Will & Emery (57) ABSTRACT

A technique for incorporating text retrieval into the logic associated with current stem search technologies. The software stem search system positions a highlight bar even if the entered text is not the first word of the highlighted item. The highlight bar is positioned without reducing the numbers of records in the stem search display. The invention utilizes a stem search engine and a database search engine to search a list of entries for a match to a stem inputted by the user for a desired entry. Since the stem search engine can only find a stem starting with the left-most characters, the database search engine is used to locate the stem in other portions of the entries in the list. The match found by the database search engine is then translated to the list of entries by highlighting the desired entry in the list such that the position of the desired entry in the list of entries may be determined from the display by the user.

16 Claims, 6 Drawing Sheets

FIG. 1

P001W01$1_BROWSE$27$D1_1_1VIEWQ1 2515

SEARCH   PRINT   ? HELP   🔖 BOOKMARK
☐ BACK   ☐ EXIT   ☐ ABOUT

Find Entries:
ACHLORHYDRIC

Entries:
anemia
achlorhydric anemia
aplastic anemia
autoimmune hemolytic
congenital hemolytic ar
Cooley's anemia
deficiency anemia
erythroblastic anemia
folic acid deficiency ane
hemolytic anemia
hyperchomic anemia
hypochromic anemia
hypoplastic anemia
iron-deficiency anemia Text:
achlorhydric anemia A hypochromic, microcytic anemia associated with a lack of free hydrochloric acid in gastric juice.

📄 COPY     📄 MAIN BROWSE

METHOD OF INTEGRATING TEXT RETRIEVAL TO ENHANCE SOFTWARE STEM SEARCHING

BACKGROUND OF THE INVENTION

1. Field of the Invention

The present invention relates to a method of integrating text retrieval to enhance software stem searching and, more particularly, to a software stem searching method which positions a highlight bar even if the entered text is not the first word of the highlighted item and does so without reducing the number of records in the stem search display.

2. Description of the Prior Art

Stem searching techniques are well known. Stem searching of items listed on a paper has existed since alphabetized lists were first printed. Stem searching is the process of looking up information based on the stem of the word or entry starting with the left-most characters. In dictionaries and encyclopedias, the "A" through "Z" tabs are cut into the page of the text allowing the user to jump to the location within the list beginning with entries starting with the selected letter. The list is unchanged by the use of such tabs, and pages of the reference are not affected.

A software based stem search, by definition, is completely analogous. Most typically, an ordered list is presented to the user as a scrolling display of entries. The user is also presented with a "type to get closer" box and tab buttons that are equivalent to the tabs of paper works. By using the mouse or the keyboard to select the tabs, the user jumps to the location within the list beginning with entries starting with the selected letter from the tab button. If the software operator is using the "type to get closer" box, he or she has the option of typing in words or phrases to be used as the "stem" of the search. In this case, the software will perform a stem search based on matching the typed in word or phrase with the entry, starting with the left most letter of the entry and matching letter for letter, from the left to the right of the entry. In the event that a match is not found, conventional stem search engines strip characters from the end of what has been typed in by the user and conduct the search again. If once again there is no match found, the highlight bar does not move from the top of the list and what the user typed in is now gone.

In some stem search software, the stem search is character case sensitive. However, most systems are case insensitive. In addition, in some stem search systems, an automated delay may be built into the system that postpones the positioning of the highlight bar in the list until the user stops typing. An alternative that is also commonly used is a character for character positioning as the stem is being typed.

In both paper and electronic systems, the drawback to a stem search is the difficulty in finding an entry if the user does not know with what letter the entry starts. For example, "sickle cell anemia" may be listed as "anemia, sickle cell". The user will be unsuccessful in finding it by entering a stem starting with an "s".

In contrast to stem searching, another standard way to search a list of entries is by performing a database search. A database search is distinctively different than a stem search. In a database search, typing in values results in presenting the user with a smaller list containing only those entries that match the entered criteria. If a database search of a paper list were possible, it would be equivalent to selecting a letter from the tab and tearing out that section of the dictionary, only showing the matching pages to the user. When the database search is unsuccessful, the database engine returns only the fact that there is no match. In contrast to the stem search, no stripping of characters occurs and there are no additional executions of the search.

The advantage of a conventional database search is its ability to search for a match anywhere in the entry, not just at the beginning "stem" of the entry. The obvious drawback to this approach is losing the view of the entry with respect to its neighboring entries. For example, searching for "sickle" will bring up "anemia, sickle cell" among a list of entries with the word "sickle" in them. However, the user will not be able to see the other types of anemias that may also be of interest. In recent years, Microsoft in its MS Officer™ line of products has substituted the stem search with the database search. This is apparent when the open file option is selected from within MS Word™. When the open file option is selected, typing in the "File Name" field and hitting enter results in displaying only those files that contain matching letters in their names.

A common issue exists with both the stem search and database search methods for searching a list of entries. In both cases, the user is searching by word matches alone. The search software has no content understanding and provides no assistance to the user in the event of a failed search. However, Agnew, et. al. in U.S. Pat. No. 4,884,218 describe a database driven expert system that is invoked to assist the user if the results of a standard database search do not produce results. Similarly, natural language database search engines attempt to translate meanings of user questions into search criteria to hide the user from the complexities of building search queries that present to the user matching entries. An example of this is the MS Office™ animated helper. Unfortunately, neither of these approaches presents a method for enhancing the stem search technology while preserving its benefits. The present invention has been developed to integrate text retrieval operations into software stem searching operations so as to reap the benefits of both types of systems.

SUMMARY OF THE INVENTION

The above-mentioned needs in the art have been met by a technique which enables stem searching while alleviating the difficulty in finding an entry when the user does not know with what letter the entry starts while preserving the view of the entry with respect to its neighboring entries. To meet this and other objectives, the software method of the invention merges technologies commonly known in the art of database searching with technologies commonly known in the art of stem searching to produce a new "Smart Stem Search™" technique in accordance with the invention.

A preferred embodiment of the method of integrating text retrieval to enhance software stem searching in accordance with the invention is implemented on a computer for allowing a user to search a list of entries for a desired entry. Generally, the method of the invention comprises the steps of:

receiving a stem inputted by the user for the desired entry and storing the inputted stem;

searching the list of entries for the inputted stem using a stem search engine until at least a portion of the inputted stem is found;

forwarding at least a portion of the stored inputted stem to a database search engine;

triggering operation of the database search engine to search for at least the portion of the stored inputted stem;

searching the list of entries for the portion of the stored inputted stem using the database search engine until at least a portion of the stored inputted stem is found; and displaying to the user the desired entry corresponding to at least the portion of the inputted stem found by at least one of the stem search engine and the database search engine whereby a position of the desired entry in the list of entries may be determined from the display by the user.

In a preferred embodiment, the database search engine returns a list of database search result entries containing only the entries in the list of entries including at least the portion of the inputted stem. A translating step translates a position of the database search result entries to a position of a corresponding entry in the list of entries. In an alternative embodiment, the database search engine searches a database for a pointer to the inputted stem in the list of entries and, if a match is found, returns the pointer corresponding to the match for use in accessing the list of entries, where the pointer is translated in the translating step to entries in the list of entries corresponding to the match.

Several embodiments of the invention are provided herein. In respective embodiments, a letter may be stripped off of the inputted stem to form a shortened stem and one or both of the searches repeated using the shortened stem. This process may be repeated until the stem is gone and no match is found. The database search engine may be alternatively triggered when "no match" is found on the inputted stem, when "no match" is found on any letter of the entire stem, when "no match" is found for a stem of a predetermined length, by external events such as a mouse event, keyboard event, button event, or the like, or the stem search engine and database search engine may be initiated at the same time upon receipt of the inputted stem. However, if the database search engine is triggered at the same time as the stem search engine or by an external event, then logic must be provided to select the desired entry when the stem search engine and the database search engine return possible matches for the desired entry.

The invention also encompasses a computer readable medium containing software which implements the steps of the method of the invention.

Also, the invention further includes a stem search system that enables a user to search a list of entries for a desired entry comprising means for receiving a stem inputted by the user for the desired entry and for storing the inputted stem, a stem search engine which searches the list of entries for the inputted stem until at least a portion of the inputted stem is found and indicates to the user if the desired entry is found, a database search engine which searches the list of entries for the inputted stem until at least a portion of the inputted stem is found and indicates to the user if the desired entry is found, and means for forwarding the stored inputted stem to the database search engine and for indicating to the user the desired entry corresponding to at least a portion of the inputted stem found by the database search engine but not the stem search engine whereby a position of the desired entry in the list of entries may be determined by the user.

BRIEF DESCRIPTION OF THE DRAWINGS

The objects and advantages of the invention will become more apparent and more readily appreciated from the following detailed description of presently preferred exemplary embodiments of the invention taken in conjunction with the accompanying drawings, of which.

DETAILED DESCRIPTION OF THE PREFERRED EMBODIMENTS

A technique for integrating text retrieval and stem searching techniques in accordance with a presently preferred exemplary embodiment of the invention will be described below with reference to FIGS. 1–6. Throughout the drawings, like reference numerals illustrate like elements. It will be appreciated by those of ordinary skill in the art that the description given herein with respect to these figures is for explanatory purposes only and is not intended in any way to limit the scope of the invention. For example, those skilled in the art will appreciate that the software techniques described herein may be implemented on a variety of types of hardware platforms and may be implemented using a variety of types of storage media to search lists of entries stored on CD ROM, an Internet server, and the like. Entries for a variety of types of databases may also be searched, such as Standard Query Language (SQL), straight index, and sequential seeking databases, text retrieval engines, and the like. Accordingly, all questions regarding the scope of the invention should be resolved by referring to the appended claims.

The methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into, or incorporated in firmware, and then executed by a machine such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 1:
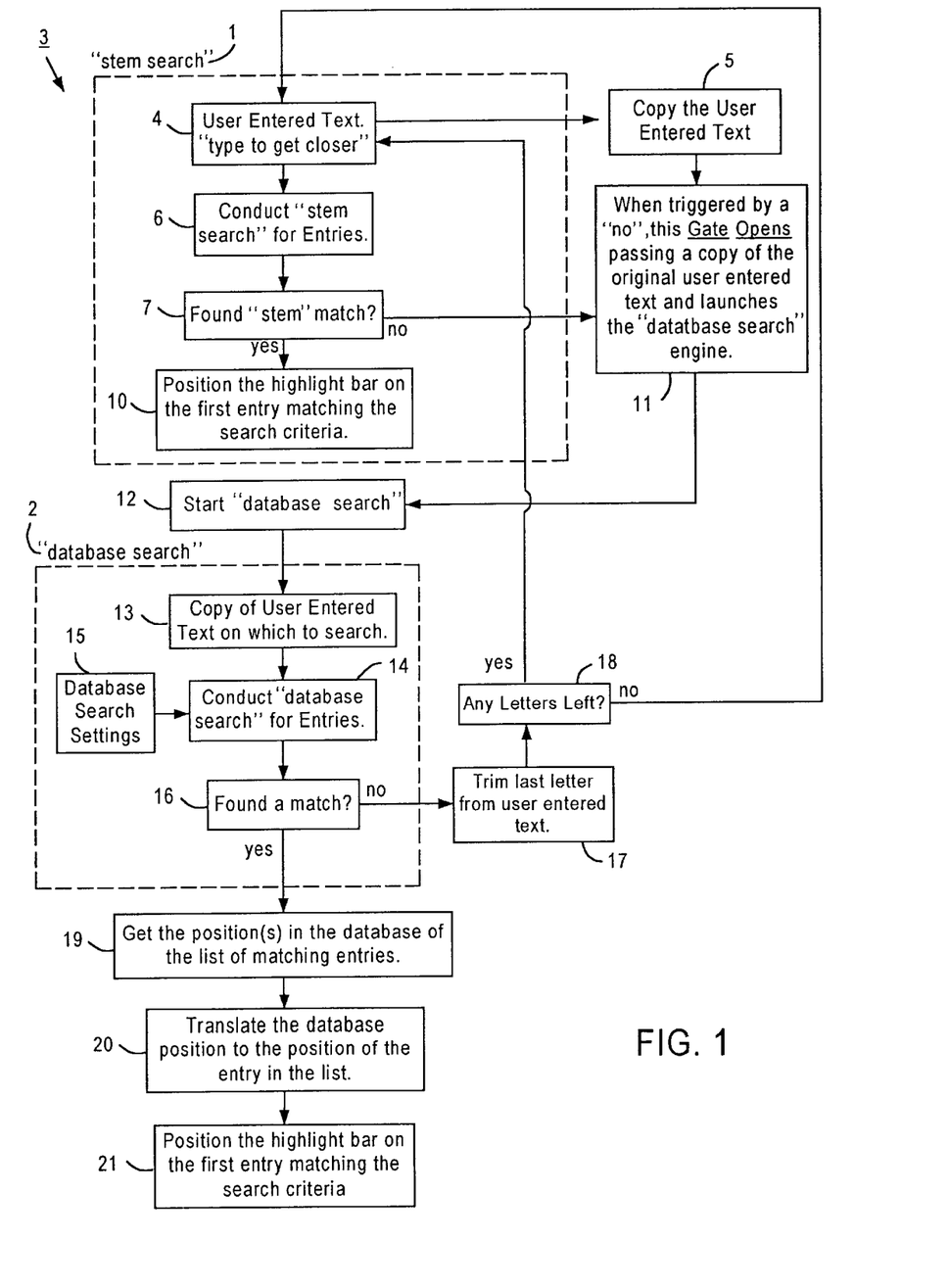
FIG. 1 illustrates a preferred embodiment of a software system which integrates a stem search engine and a database search engine in accordance with the techniques of the invention.

FIG. 1 illustrates a preferred embodiment of a software system which integrates a stem search engine 1 including steps 4, 6, 7, and 10 in the dotted lines and a database search engine 2 including steps 13–16 in the dotted lines, in accordance with the techniques of the invention. In the preferred embodiment of the software system 3 of the invention, the conventional stem search engine is replaced by the "Smart Stem Search™" technique of the invention. As illustrated, the conventional stem search engine 1 is initiated when the user enters text or "types to get closer" at step 4 to stem search the list. In accordance with the invention, the entry of text at step 4 initiates the step of making a copy of the user entered text at step 5. At step 4, the text input by the user is monitored and the stem is forwarded for a stem search at step 6 after passage of a predetermined time delay after entry of the last character. As the conventional stem search is conducted at step 6, the software of the invention monitors the results. In particular, if a stem search match is found at step 7, a highlight bar is positioned on the first entry that matches the entered "stem" of the search at step 10 and the stem search is complete. As noted above, steps 4, 6, 7, and 10 are conventional steps performed by known stem search engines 1. However, in accordance with the invention, if a stem search match is not found at step 7, then the software of invention intervenes to provide a new pathway to enhance the unsuccessful stem search.

In particular, in the event that the entered stem has not been found at step 7, a "gate" is triggered to open at step 11 to pass a copy of the original user entered stem text for starting the database search engine 2 at step 12. Once the database search engine 2 is started at step 12, the passed copy of the original user entered text is copied into the database search engine 2 at step 13. The database search engine 2 then references database search settings 15 such as wild card, proximity, and Boolean "and" & "or" combinations and conducts the database search at step 14. If a match is found at step 16, the database search engine 2 returns a list containing only the matching entries at step 19. From this list, the software of the invention analyzes and extracts the first occurrence that matches the order of the list of entries at step 20. In other words, at step 20, the database position at the location of the match is translated to the position of the entry in the list. For example, a database search may return a list in alphabetic order (e.g. "Sickle Cell Anemia" in the "S" entries) while the displayed list of entries to the user may be in hierarchical order (e.g. Anemia, Sickle Cell). A translation is required to find the correct record in the returned set of records that matches the displayed order of the records, and this translation is performed at step 20. Once translated, the highlight bar is positioned on the first matching entry of the entire list at step 21, thereby maintaining the "stem search" relationship with the other entries.

However, if a match is not found at step 16 (i.e., the stem search and the database search fails for the inputted stem), the software of the invention receives that result and trims the last letter from the copy of the user-entered text at step 17. The software of the invention then checks at step 18 to determine if there are any letters left. If there are, the trimmed stem is entered into the stem search engine 1 and the entire process is repeated for the trimmed stem. This cyclic control of the stem search engine 1 and the database search engine 2 continues until a match is found at step 7 and the highlight bar is positioned at step 10, until a match is found at step 16 and the highlight bar is positioned at step 21, or the last letter is trimmed at step 17 and there are no letters left at step 18. In the event there are no letters left at step 18, the user is returned to the beginning of the stem search process 1 with the highlight bar at the top of the list of entries and ready to accept new stem search text at step 4.

Figure 2:
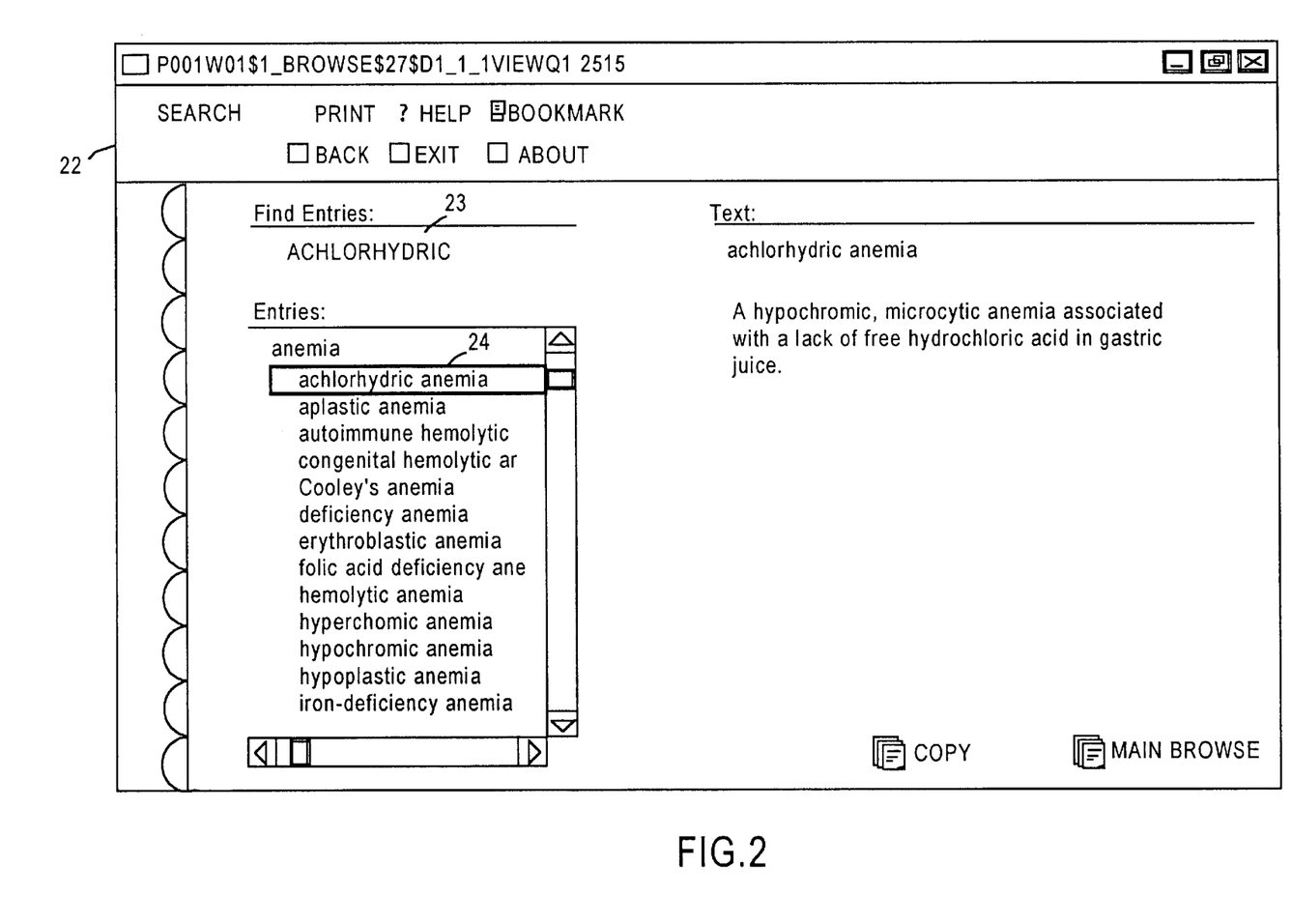
FIG. 2 illustrates a user interface display indicating the inputted stem and highlighted entry found using the enhanced stem searching technique of the invention.

FIG. 2 illustrates a user interface display 22 indicating the inputted stem 23 and entry highlighted by highlight bar 24 found using the enhanced stem searching technique of the invention. As illustrated, a highlight bar 24 generated by the software of the invention is positioned over "achlorhydric anemia" found by the database search even though the stem "achlorhydric" is found under "anemia". The number of records in the stem search display is unaffected.

An implementation of the preferred embodiment of the software system of FIG. 1 in source code in the computer languages C and $C^{++}$ is illustrated in Appendix A. In this implementation, the techniques of the invention have been used within the database engine and the stem search engine to integrate these techniques. In the source code of Appendix A, routines are illustrated for monitoring the user input, taking into account a predetermined time delay, and performing stem searching. The "type to get closer" routine initiates the "Smart Stem Searching™" technique of the invention, and then the highlight bar 24 is positioned as appropriate.

Figure 3:
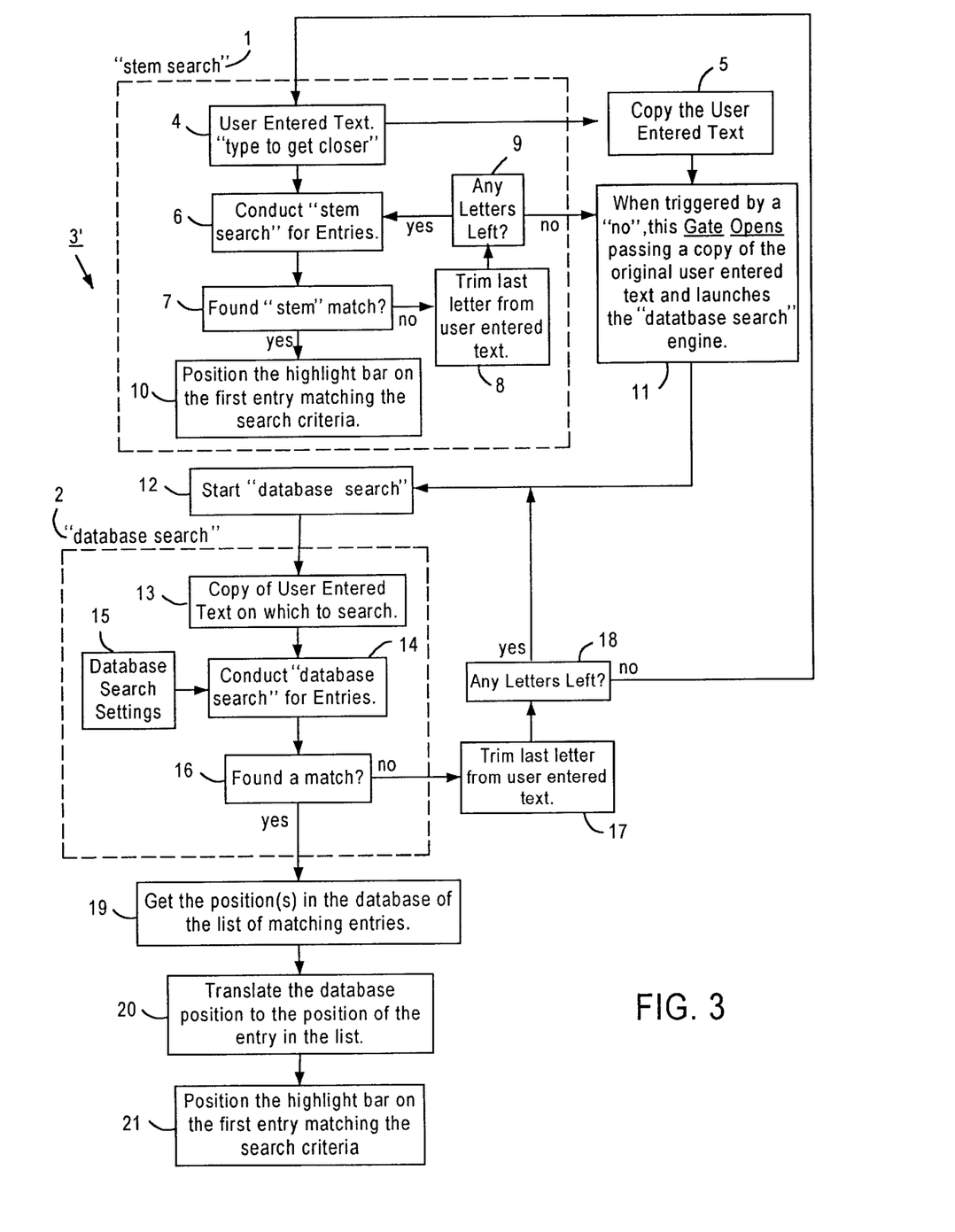
FIG. 3 illustrates an embodiment of a software system which integrates a stem search engine and a database search engine whereby the database search engine is not initiated until the stem search engine has completed its search.

FIG. 3 illustrates an alternative embodiment of a software system 3' which integrates a stem search engine and a database search engine in accordance with the techniques of the invention. This embodiment is very similar to the embodiment of FIG. 1 except that the stem search engine 1 conducts its search until no characters are left before triggering the gate to open at step 11 to initiate the database search with the original stem string. In this embodiment, if a stem search match is not found at step 7, a letter is trimmed from the end of the user entered text at step 8. Then, if it is determined at step 9 that there are any letters left after the last letter has been trimmed, the stem search is conducted again at step 6 with text that is one letter less than that used in the prior search at step 6. If the stem search component has been unsuccessful, then one-by-one all the letters have been trimmed until there are none left to perform a conventional stem search. At this time (i.e., when no characters of the inputted stem are left), the gate is triggered to open at step 11 and the original inputted stem is passed for starting the database search engine 2 at step 12. Steps 12–21 are then conducted as in the embodiment of FIG. 1 with the exception that when it is determined at step 18 that letters are left in the trimmed stem, the database search but not the stem search is repeated for the trimmed stem.

Figure 4:
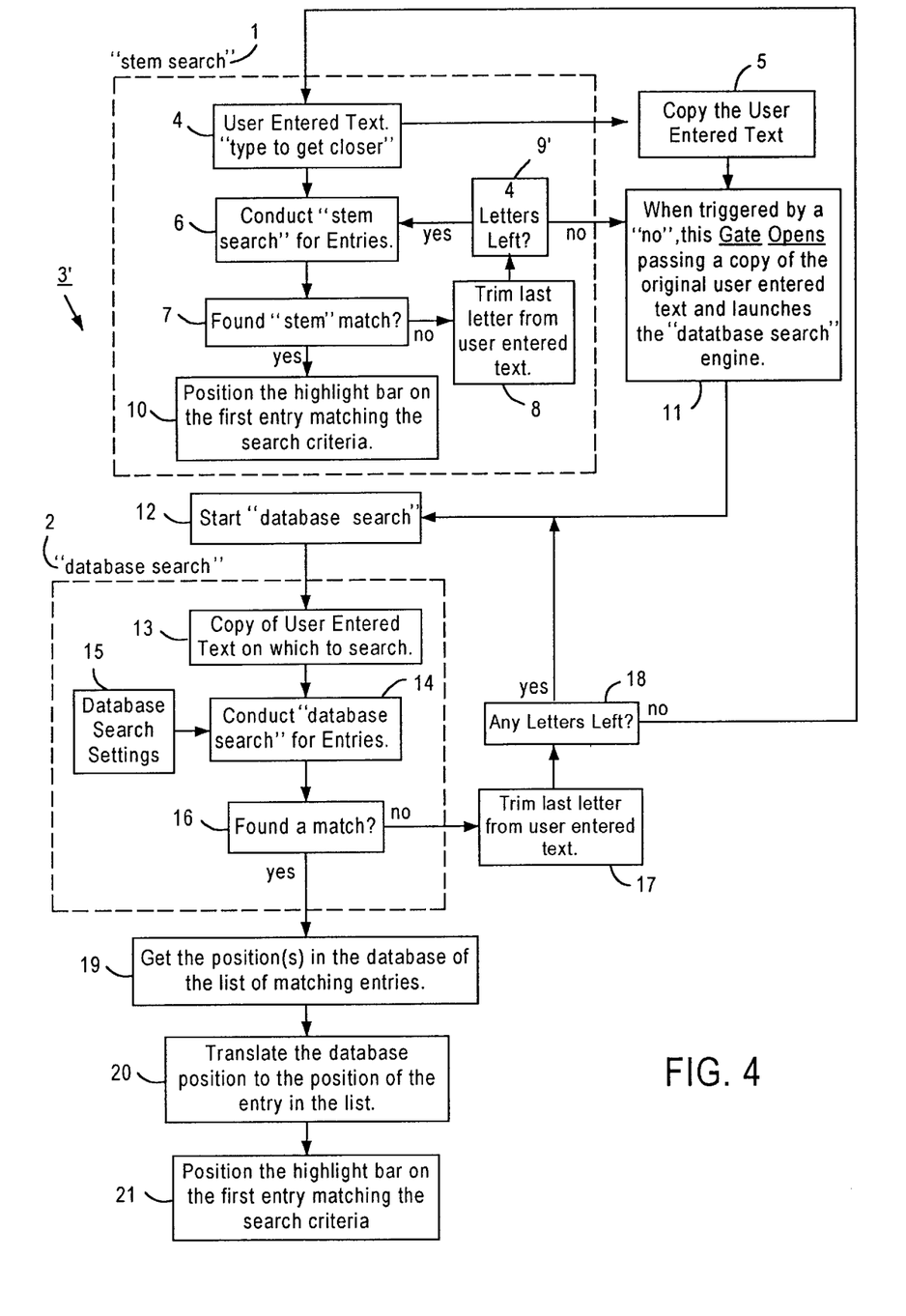
FIG. 4 illustrates an embodiment of a software system which integrates a stem search engine and a database search engine whereby the database search engine is initiated when the stem search engine has trimmed the input stem down to 3 letters.

FIG. 4 illustrates a modified embodiment of a software system 3' of FIG. 3 which, rather than waiting for a determination at step 9 that no letters are left in the inputted stem, triggers the gate to open at step 11 to initiate the database search when it is determined at step 9' that the stem search engine has trimmed the input stem down to 3 letters. The original inputted stem or, alternatively, the trimmed stem, is then passed for starting the database search engine 2 at step 12. Of course, a different number of letters could be chosen for this purpose. Steps 12–21 are then conducted as in the embodiment of FIG. 3.

Figure 5:
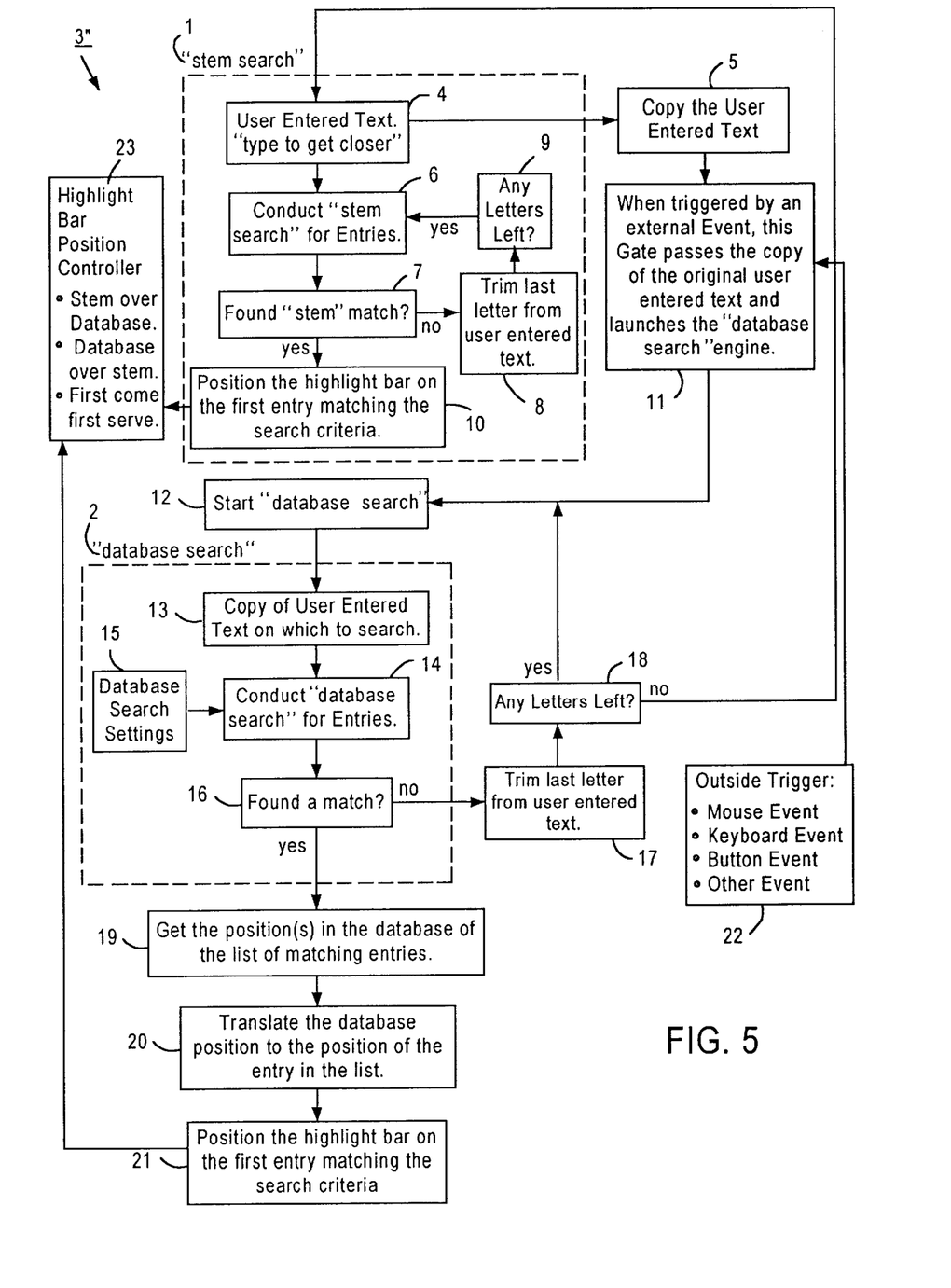
FIG. 5 illustrates an embodiment of a software system which integrates a stem search engine and a database search engine whereby the database search engine is initiated by an external event.
Figure 6:
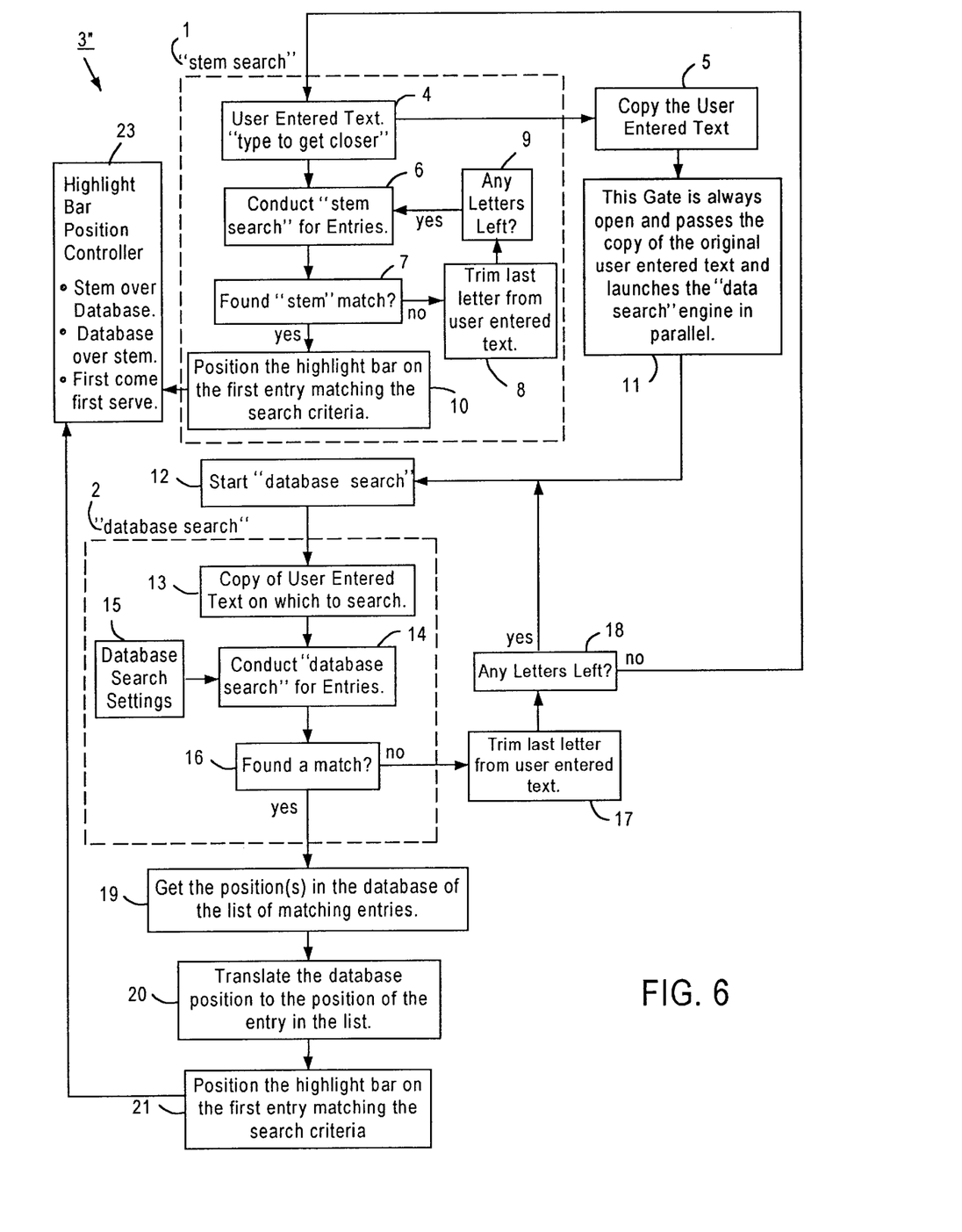
FIG. 6 illustrates an embodiment of a software system which integrates a stem search engine and a database search engine whereby the database search engine is initiated at the same time as the stem search engine.

FIG. 5 illustrates another embodiment of a software system 3" which integrates a stem search engine and a database search engine in accordance with the techniques of the invention. This embodiment is very similar to the embodiment of FIGS. 1, 3 and 4 except that operation of the database search engine is not strictly dependent upon the success or failure of the stem search engine 1. In this embodiment, an external event, such as a mouse event, a keyboard event, a button event, or some other event is detected at step 22 and, upon detection of such an event, the gate is triggered to open at step 11 to pass a copy of the original user entered stem text for starting the database search engine 2 at step 12. In this fashion, the database search engine 2 and stem search engine 1 may operate in parallel independently of each other. Steps 12–21 are then conducted as in the embodiment of FIG. 1 with the exception that highlight bar position controller logic 23 must be added to determine whether the stem search engine 1 or the database search engine 2 has priority in determining where to position the highlight bar in the event that both engines return a valid list position. Also, as indicated in FIG. 6, the gate may always be open at step 11 whereby the stem search engine 1 and the database search engine 2 are always initiated at the same time and operate in parallel, thereby removing any reliance upon an external event.

Those skilled in the art will appreciate that implementation of the embodiments described above with respect to FIGS. 1–6 is not limited to programming within the source code of both engines as in the implementation of Appendix A. For example, if the programmer does not have access to the source code of both the stem search engine 1 and the database search engine 2, a second database could be used for the database search of step 14 that points to the stem search list of the first database to determine how to position the highlight bar 24. This second database could then be used to translate from the database search results to the displayed stem search list. In this example, if the stem search fails, the database search engine 2 searches the second database for the input stem search string. The second database stores the number of the entry in the stem search list (e.g. Sickle Cell Anemia is listed as the $253^{rd}$, $988^{th}$, and $164^{th}$ entry). When the software of the invention finds the set of records for the sickle cell entry in the second database, it searches for the one with the lowest entry number in the list (e.g. 164). In the above example, the software of the invention would position the highlight bar 24 on the $164^{th}$ entry in the stem search list of the first database.

Those skilled in the art will further appreciate that, rather than merely copying the user's entered text at step 5, other "set up" parameters or database search settings 15 may be stored and fed to the database search engine 2 in accordance with the techniques of the invention. For example, the database search settings 15 may permit the following variations:

(a) If more than one word is entered by the user in the search box, the database search engine 2 may search for the words together as a phrase.

(b) If more than one word is entered by the user in the search box, the database search engine 2 may search for the words as independent items (e.g. "A B" searches for A and B together in the same entry).

(c) If more than one word is entered by the user in the search box, the database search engine 2 may search for either of the words (e.g. "A B" searches for either A or B in the same entry).

(d) The database search engine 2 also may allow wild card searches (e.g. "Al*" searches for all words beginning in "Al", while "*al" searches for all words ending in "al"). Different kinds of wild cards may be used (e.g. *, ?, etc.).

(e) The database search engine 2 also may allow reverse word searches (e.g. "tset" is returned for the entry "test").

(f) The database search engine 2 may further allow searching only from the beginning of the entry.

(g) The database search engine 2 may restrict searching for a word to the case entered.

(h) The database search engine 2 may allow searching for synonyms.

(i) The database search engine 2 may allow proximity searching. Of course, other known database searching characteristics may be incorporated into the techniques of the invention by those skilled in the art.

Although exemplary embodiments of the invention have been described in detail above, those skilled in the art will appreciate that many additional modifications are possible in the exemplary embodiments without materially departing from the novel teachings and advantages of the invention. For example, those skilled in the art will appreciate that, using the same approach as discussed above and illustrated in FIGS. 1–6, other embodiments of the invention could incorporate expert system database searching technologies, natural language query technologies, and/or a combination thereof by using these technologies to define in more detail the database search component of the illustrated embodiments. As would be apparent to those skilled in the art, other events such as pop-up error messages (e.g. "Search string not found"), control over the database settings, time delay adjustments, end other settings and responses could be added to the illustrated embodiments. In addition, other types of database search and stem search engines may also be used. Not only may one search engine be substituted for another, but also, a plurality of search engines may be chained together to operate together. Accordingly, all such embodiments are within the scope of the invention described in the attached claims.

APPENDIX A

```
int UI_APPLICATION::Main(void)
{
                if(m->doLetterCompleteTime != 0)
                {
                    ZIL_TIME t;
                    if(t>m->doLetterCompleteTime) {
                        m->doLetterCompleteTime = 0;
                        DbfDisplayPtr *dp = (DbfDisplayPtr *)m->Scrollers.First( );
                        while (dp != 0 && dp->d != m->doLetterComplete)
                            dp = (DbfDisplayPtr *)dp->Next( );
                        if (dp != 0 && dp->d != 0)
                            dp->d->doLetterCompletion( );
                        m->idleReloadCursor = 1;
                        continue;
                    }
                }
}
int DbfDisplay::doLetter(const UI_EVENT &event)
```

APPENDIX A-continued

```
{
    //returns | if actually did anything
    int rslt = 0;
    if(!ds_type) return 0;
    if(aDb.shared->SortExpr == 0)       //unsorted displays cant get closer
        return 0;
    if(!aDb.shared->SortExpr->isValid( ))
        return 0;
    if(!ds_ttgchde.is_null( ))
    {
        char *tmptr = (char *)ds_ttgchde.c_str( );
        if(*tmptr == 'Y' || *tmptr == 'y' || *tmptr == 'T' || *tmptr == 't')
            return 0;
    }
    //numeric sort order - can't be type to get closer
    int sortType = aDb.shared->SortExpr->type( );
    char smallString[2];
    smallString[0] = event.key.value; smallString[1] = 0;
    //should do the toupper based on search key containing UPPER
    smallString[0] = toupper(smallString[0]);
    search_letters.resize(search_amount);
    if(search_pos >= (search_amount) ) {
        search_letters += smallString;
        search_amount++;
        search_pos = search_amount;
    }
    //we're in the middle somewhere
    else {
        search_letters.insert(search_pos++,smallString);
        search_amount++;
    {
    //now check for truncation due to sort field size
    if(sortType == r4date || sortType == r4num || sortType == r4str)
    {
        if(search_amount > aDb.shared->SortExpr->len( ))
        {
            search_amount = aDb.shared->SortExpr->len( );
            search_letters.resize(search_amount);
        }
    }
    if(sys_lookfor)
        sys_lookfor->LoadInformation( );
    m->doLetterComplete = this;
    m->doLetterCompleteTime.Import( ); // set next status time to now
    m->doLetterCompleteTime += TYPEAHEAD_DELAY;       // plus .25 seconds
    return TRUE;
}
int DbfDisplay::doLetterCompletion(int ignoreDsFlag)
{
    // returns 1 if actually did anything
    int rslt = 0;
#ifdef TABERS
    int FollowingLink = 0;
    if(search_amount < 0 && ignoreDsFlag)
    {
        FollowingLink = 1;
        search_amount *= -1;
    }
#endif
    m->doLetterCompleteTime = 0;
    m->doLetterComplete = 0;
    if(!ds_type && ignoreDsFlag==0) return 0;
    string local_search = search_letters;
    if(!look4_expr.is_null( ))
    {
        Expr4 ttgExpr;      //jim 6-25-97 adjust for static-trans new stuff.
#ifdef MERGE_TRANS_AND_STATIC_DBFS
        if(aDb.shared->keyDb)
        {
            if(*aDb.shared->keyDb_StaticFlag.str( ) == 'S')
            {
                ttgExpr.parse(aDb.shared->aPosStatic->db->DB,(char *)look4_expr.c_str( ));
            }
            else
            {
                ttgExpr.parse(aDb.shared->aPos->db->DB,(char *)look4_expr.c_str( ));
            }
        }
        else
```

APPENDIX A-continued

```
            ttgExpr.parse(aDb.shared->aPos->db->DB,(char *)look4_expr.c_str( ));
#else
            ttgExpr.parse(aDb.shared->aPos->db->DB,(char *)look4_expr.c_str( ));
#endif
        if(ttgExpr.isValid( ))
        {
            local_search = ttgExpr.vary( );
            local_search.resize(ttgExpr.len( ));
            local_search=local_search.strip(string::Trailing);
            ttgExpr.free( );
        }
    }
    rslt = aDb.shared->seek2(local_search.c_str( ));
#ifdef TABERS
    if(rslt == 0 && !FollowingLink && !ds_iflt)
    {
        char *IsApp;
        IsApp = aDb.shared->fi->d->data->record;
        if(stmemp(IsApp, " &FG6:",6) == 0)
            rslt = 1;
    }
#endif
    int sortType = 0;
    if(aDb.shared && aDb.shared->SortExpr)
        sortType = aDb.shared->SortExpr->type( );
    if(sortType == r4date || sortType == r4num || sortType == r4str)
    {
        while (rslt != 0 && search_amount > 0)
        {
#ifdef SMART_TYPE_TO_GET_CLOSER
            if(rslt != 0 && search_amount > 0 && !ds_tgc_wrd.is_null( ))
            {
                DbList *dblist = 0;
                //need adDb push?
                aDb.shared->aPos->PushPos( );     //hold normal index, et all,
                stringaSearch = ds_tgc_wrd; // ie WORDS(TITLE)
                aSearch += "=\"";
                //prepend original search
                if(!aDb.shared->queryDbB4MemAndQNames.is_null( ))
                {
                    string sTemp;
                    sTemp = "(";
                    sTemp += aDb.shared->queryDbB4MemAndQNames;
                    sTemp += ").AND.";
                    aSearch.prepend(sTemp);
                }
                //first try with exact words
                dblist = newDbList((char *)databaseName.c_str( ),
                    (char *)aSearch.c_str( ),(char *)local_search.c_str( ),"\"",
                    0,0,0,(char *)ds_ix_exp.c_str( ));
                rslt = dblist->top( );
                string newLocalSearch;
                if(rslt == 0)
                {
                    newLocalSearch = dblist->Fchar(1); //only expr in expr list
                    newLocalSearch = newLocalSearch.strip(string::Both);
                }
                else
                {
                    //if that failed - then try with wild card on end
                    delete dblist;
                    dblist = new DbList((char *)databaseName.c_str( ),
                        (char *)aSearch.c_str( ),(char *)local_search.c_str( ),""/\"",
                        0,0,0,(char *)ds_ix_exp.c_str( ));
                    rslt = dblist->top( );
                    if(rslt == 0)
                    {
                        newLocalSearch = dblist->Fchar(1); //only expr in expr list
                        newLocalSearch = newLocalSearch.strip(string::Both);
                    }
                }
                delete dblist;
                dblist = 0;
                aDb.shared->aPos->PopPos( );      // restore index and location
                if(!newLocalSearch.is_null( ))
                    local_search = newLocalSearch;
                rslt = aDb.shared->seek2(local_search.c_str( ));
#ifdef TABERS
                if(rslt == 0 && !FollowingLink & !ds_iflt)
```

APPENDIX A-continued

```
                    {
                        char *IsApp;
                        IsApp = aDb.shared->fi->d->data->record;
                        if(strnemp(IsApp," &FG6:",6) == 0)
                            rslt = 1;
                    }
#endif
                }
#endif
        if(rslt != 0)
        {
                        search_amount—;
                        if(search_pos>search_amount)
                            search_pos=search_amount;
                        search_letters.resize(search_amount);
                        local_search = search_letters;
                        if(!look4_expr.is_null( ))
                        {
                            //needs adjustment for static-trans databases
                            Expr4 ttgExpr;
#ifdef MERGE_TRANS_AND_STATIC_DBFS
                            if(aDb.shared->keyDb)
                            {
                                if(*aDb.shared->keyDb_StaticFlag.str( ) == 'S')
                                {
                                    ttgExpr.parse(aDb.shared->aPosStatic->db->DB,
                                        (char *)look4_expr.c_str( ));
                                }
                                else
                                {
                                    ttgExpr.parse(aDb.shared->aPos->db->DB,
                                        (char *)look4_expr.c_str( ));
                                }
                            }
                            else
                                ttgExpr.parse(aDb.shared->aPos->db->DB,
                                    (char *)look4_expr.c_str( ));
#else
                            ttgExpr.parse(aDb.shared->aPos->db->DB,(char *)look4_expr.c_str( ));
#endif
                            if(ttgExpr.isValid( ))
                            {
                                local_search = ttgExpr.vary( );
                                local_search.resize(ttgExpr.len( ));
                                local_search=local_search.strip(string::Trailing);
                                ttgExpr.free( );
                            }
                        }
                        rslt = aDb.shared->seek2(local_search.c_str( ));
#ifdef TABERS
                        if(rslt == 0 && !FollowingLink && !ds_iflt)
                        {
                            char *IsApp;
                            IsApp = aDb.shared->fi->d->data->record;
                            if(strncmp(IsApp,"&FG6:",6) == 0)
                                rslt = 1;
                        }
#endif
                }
            }
        }
        if(sys_lookfor && !ignoreDsFlag)
            sys_lookfor->LoadInformation( );
        //curHighlight adj was here - caused S_CURRENT to wrong line before
        // new data loaded, so moved after loadallbufers - jim - 3-9-97
        //did not work with SEGMENTED dandf.
        if(curHighlight != 1) {
            curHighlight = 1;
            DbField *fl = firstFieldInSlot[curHighlight];
            if(fl==0)
                fl = firstFieldInSlot[0];
            if(fl && fl->onScreen) {
                *this + fl->onScreen;
            }
        }
        aDb.shared->LoadAllBuffers( );
        refreshAllOtherScrollers( );
        displayAllFields( );
        updateScrollBar( );
```

APPENDIX A-continued

```
        speakFieldsAtSlot(curHighlight);
        return TRUE;
}
```

We claim:

1. A method implemented on a computer for allowing a user to search a list of entries for a desired entry, comprising the steps of:

receiving a stem inputted by the user for said desired entry and storing the inputted stem;

searching said list of entries for the inputted stem using a stem search engine until at least a portion of the inputted stem is found;

forwarding at least a portion of the stored inputted stem to a database search engine;

triggering operation of said database search engine to search for at least said portion of the stored inputted stem;

searching said list of entries for said portion of the stored inputted stem using said database search engine until at least a portion of the stored inputted stem is found; and displaying to the user the desired entry corresponding to at least said portion of the inputted stem found by at least one of said stem search engine and said database search engine whereby a position of said desired entry in said list of entries may be determined from the display by the user.

2. A method as in claim 1, wherein said triggering step initiates operation of said database search engine at the same time said stem search engine is initiated to search for said inputted stem.

3. A method as in claim 2, wherein if both said stem search engine and said database search engine return possible matches for said desired entry, then said method includes the additional step of determining which of said possible matches to display to the user in said displaying step as the desired entry.

4. A method as in claim 1, wherein said displaying step comprises the step of displaying at least one entry in said database adjacent said desired entry.

5. A method as in claim 1, wherein said displaying step includes the step of displacing a highlight bar over said desired entry.

6. A method as in claim 1, wherein, after a search of said list of entries, said database search engine returns a list of database search result entries containing only the entries in said list of entries including at least said portion of the inputted stem, comprising the further step of translating a position of said database search result entries to a position of a corresponding entry in said list of entries.

7. A method as in claim 6, wherein said searching step using said database search engine comprises the step of searching a database for a pointer to said inputted stem in said list of entries and, if a match is found, returning the pointer corresponding to the match for use in accessing said list of entries, said pointer being translated in said translating step to entries in said list of entries corresponding to said match.

8. A method as in claim 1, wherein if said desired entry is not found in either of said searching steps, then said method includes the steps of stripping a letter off of said inputted stem to form a shortened stem and repeating said stem search and said database search for said shortened stem.

9. A method as in claim 8, wherein said triggering step initiates operation of said database search engine when said stem search engine returns a "no match" indication.

10. A method as in claim 1, wherein if said desired entry is not found in said searching step using said stem search engine, then said method includes the steps of stripping a letter off of said inputted stem to form a shortened stem and repeating said stripping and searching step using said stem search engine until said shortened stem has a predetermined length.

11. A method as in claim 10, wherein said triggering step initiates operation of said database search engine when said stem search engine returns an indication that said shortened stem having said predetermined length is not found.

12. A method as in claim 10, wherein if said desired entry is not found in said searching step using said database search engine, then said method includes the steps of stripping a letter off of said inputted stem to form a shortened stem and repeating said database search for said shortened stem.

13. A method as in claim 1, wherein said triggering step comprises the steps of detecting an external event and initiating said database search engine upon detection of said external event.

14. A method as in claim 13, wherein if both said stem search engine and said database search engine return possible matches for said desired entry, then said method includes the additional step of determining which of said possible matches to display to the user in said displaying step as the desired entry.

15. A computer readable medium containing software which enables a user to search a list of entries for a desired entry, said software implementing the steps of:

receiving a stem inputted by the user for said desired entry and storing the inputted stem;

searching said list of entries for the inputted stem using a stem search engine until at least a portion of the inputted stem is found;

forwarding at least a portion of the stored inputted stem to a database search engine;

triggering operation of said database search engine to search for at least said portion of the stored inputted stem;

searching said list of entries for said portion of the stored inputted stem using said database search engine until at least a portion of the stored inputted stem is found; and displaying to the user the desired entry corresponding to at least said portion of the inputted stem found by at least one of said stem search engine and said database search engine whereby a position of said desired entry in said list of entries may be determined from the display by the user.

16. A stem search system that enables a user to search a list of entries for a desired entry, comprising:

means for receiving a stem inputted by the user for said desired entry and for storing the inputted stem;

a stem search engine which searches said list of entries for the inputted stem until at least a portion of the inputted stem is found and indicates to the user if the desired entry is found;

a database search engine which searches said list of entries for said inputted stem until at least a portion of the inputted stem is found and indicates to the user if the desired entry is found; and means for forwarding the stored inputted stem to the database search engine and for indicating to the user the desired entry corresponding to at least a portion of the inputted stem found by said database search engine but not said stem search engine whereby a position of said desired entry in said list of entries may be determined by the user.

* * * * *